Jan. 29, 1952  R. W. SMEDS  2,583,897
AUTOMATIC VINEYARD CULTIVATOR
Filed July 3, 1950

ROY W. SMEDS
INVENTOR

HUEBNER, BEEHLER, WORREL,
HERZIG & CALDWELL
ATTORNEYS

BY Richard M. Worrel

Patented Jan. 29, 1952

2,583,897

UNITED STATES PATENT OFFICE 2,583,897

AUTOMATIC VINEYARD CULTIVATOR

Roy W. Smeds, Reedley, Calif.

Application July 3, 1950, Serial No. 171,786

4 Claims. (Cl. 97—137)

The present invention relates to automatic implements and more particularly to a vineyard cultivator adapted automatically to work the soil adjacent and between spaced obstructions arranged in rows, such as grapevines, stakes, trees, and the like.

Although the device of the present invention is not limited to vineyard use, its utility and mode of operation are conveniently exemplified by reference thereto. In viticulture it is the practice at least once a year thoroughly to work the soil closely adjacent to the vines. This is done to destroy weeds so as to minimize their waste of soil moisture and nutrient materials and to remove debris that not infrequently provides a haven for harmful insects, fungi and other pests. It is the conventional practice in thoroughly tilling a vineyard, initially to cultivate the soil in as wide a swath as permitted by the spacing of the rows of vines. Subsequently, the soil is cultivated closely adjacent to the rows and between the vines in the rows. This cultivation must be carefully performed to avoid damage to the vines yet thoroughly affected to remove weeds, insect and fungicide harboring material, and other debris from adjacent to the vines.

This operation is customarily performed by means of a French plow, generally of the type shown and described in United States Patent No. 1,648,384, to Garric, which is manually guided to travel between the vines as it is drawn closely adjacent to a row thereof. The employment of such manually operated plows not infrequently resluts in substantial damage and not infrequent destruction to vines by too forcefully striking the trunks thereof, or snagging surface roots. Following the French plow operation, it is usually necessary to remove weeds and debris not reached by the plow by shoveling, hoeing, or other hand operations.

Various automatically controlled devices have been devised to work the soil along the rows and between the vines in a more facile manner than achieved by French plows. These automatic devices, however, have been subject to certain disadvantages which the present invention seeks to overcome. The disadvantages of the devices have generally been so serious that many farmers continue to employ hand manipulated French plows and even to perform the cultivating around the vines by hand tools, both tedious and expensive operations. For example, automatic implements of the type are of considerable expense and, due to the fineness of adjustment required, frequently get out of order and provide unpredictable performance characteristics. These devices almost uniformly provide a pivotal guard which is disposed for vine contact upon forward movement of the device and which triggers a control mechanism by vine engagement. If the guard arms are preconditioned for triggered operation by small vines and the like, they are also triggered by encountering large weeds, sticks, and other obstructions resulting in erratic operation. If adjusted to operate only upon forcible contact with a solid obstruction, they are not triggered by small vines and thus any vineyard having young replacement vines scattered therethrough can not be cultivated by such a device without removing the small vines with the weeds. Further, the guard arms not infrequently break off old vines having weakened stumps, skin or abrade the vines, and otherwise fail in the intended performance of their functions.

It is therefore an object of the present invention to provide an improved automatic cultivator for working the earth closely adjacent and between vines, trees, and other obstructions arranged in rows.

Another object is to provide an automatic vineyard cultivator adapted to be drawn along spaced vines and the like arranged in rows and by contact with the vines laterally to reciprocate an earth working tool employed therein to remove weeds, debris, and the like from between the vines and adjacent thereto.

Another object is to provide an automatic vineyard cultivator of the type controlled by vine contact which is suited to operation in both frail young vines and mature vines with equal efficiency.

Another object is to provide an automatic vineyard cultivator controlled by vine contact which minimizes skinning, abrasion, and other deleterious effects upon the vines conventionally experienced in devices of the type.

A further object is to provide a fully effective automatic vineyard cultivator which is economical to produce, easily adjusted, and durable in operation.

Still further objects and advantages will become apparent in the subsequent description in the specification.

In the drawing:

Fig. 1 is a plan view of a vineyard cultivator embodying the principles of the present invention shown attached to a fragmentarily illustrated draft appliance for motivation along a row of grapevines or the like.

Fig. 2 is a side elevation of the vineyard cultivator shown in Fig. 1 and a fragmentary longitudinal section of the draft appliance, as viewed from line 2—2 thereof.

Figures 1, 2:
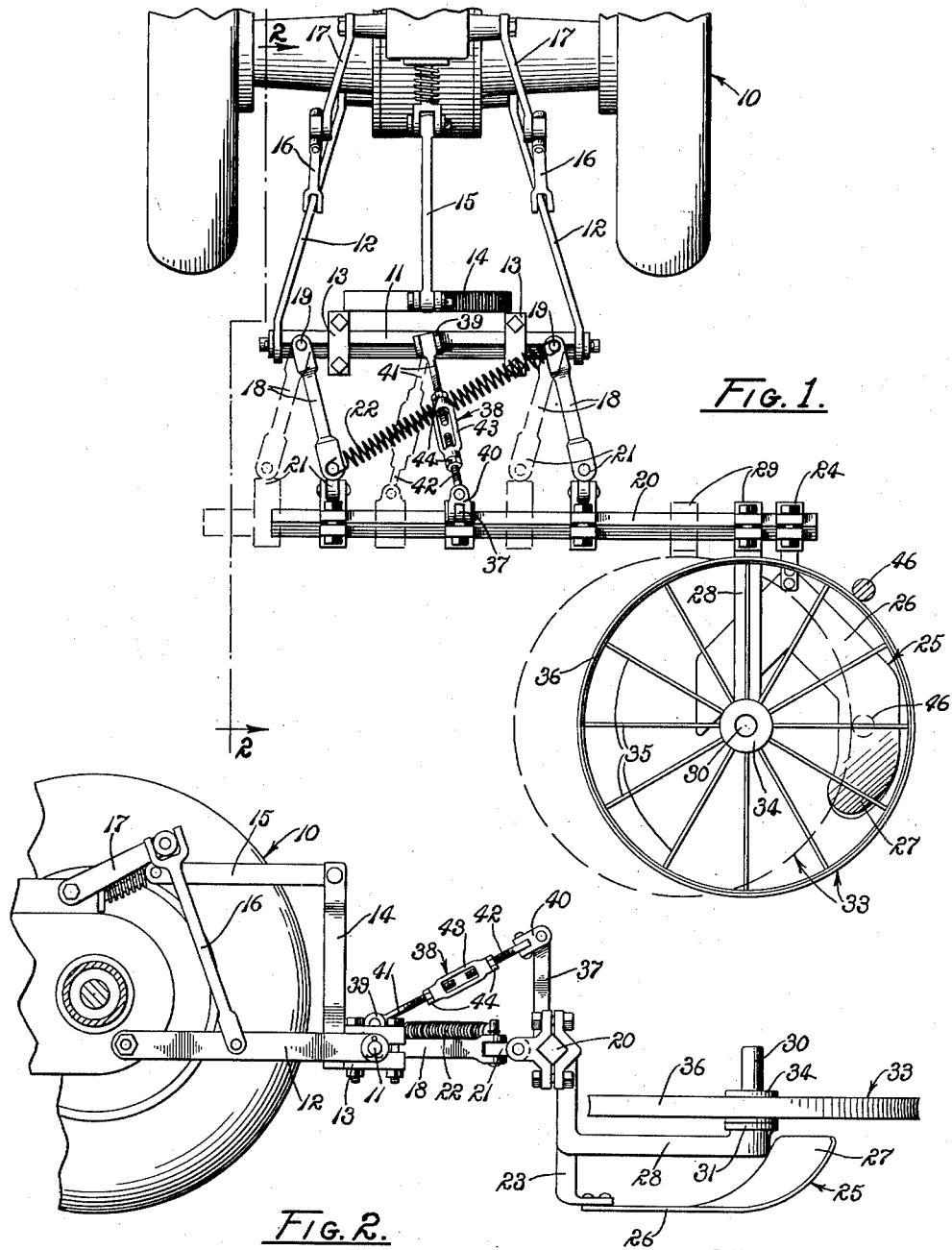

Referring in greater detail to the drawing:

A draft appliance is fragmentarily illustrated at 10 having a draft bar 11 horizontally mounted rearwardly thereof substantially transversely disposed to the normal line of draft of the appliance. The draft appliance conveniently takes the form of a tractor, truck, or other suitable prime mover. The draft bar is mounted in any convenient manner such as the conventional form shown in the drawings employing a pair of pivoted links 12 rearwardly extended from the appliance. The opposite ends of the draft bar are journaled in the rearwardly extended ends of the links. A pair of clamps 13 embrace the draft bar and mount an upwardly extended A frame 14 of well known form. A strut 15 substantially parallel to the links 12 pivotally interconnects the upwardly extended end of the A frame 14 and a portion of the appliance such as a snubbing mechanism, governing device, or the like. It will be observed that during elevational movement of the draft bar, the A frame and strut 15 in cooperation with the links 12 maintain the draw bar in constant attitude even though rotatably mounted in the links. Elevating arms 16 are pivotally connected to the links 12 intermediate the draft bar 11 and the draft appliance and to mechanically, hydraulically or pneumatically located control cranks 17 on the draft appliance. It is understood that the present invention is not limited to connection to a draft bar 11 mounted for elevational movement as described, or other structure achieving elevational movement, but is illustrated thereby in a form found excellently suited to viticulture inasmuch as controlled locating of the cranks 17, in the well known manner, elevates the draft bar 11 and implements connected thereto, as desired.

A pair of legs 18 are pivotally mounted on the draft bar 11, as at 19, in spaced relation for horizontal pivotal movement. A tool bar 20 is mounted in a horizontal position on the rearwardly extended ends of the legs 18, preferably by universal joints 21. The pivotal mounting 19 of the legs 18 on the draft bar 11 and the mounting of the tool bar 20 by means of the universal joints 21 provide a substantially horizontal skewable parallelogram draft frame in which the tool bar 20 may be transversely reciprocated relative to a line of draft while maintaining constant transverse attitude relative to the line of draft. The universal joints also permit the rocking of the tool bar 20 for a purpose soon to become apparent. Where no such rocking is desired, simple pivotal connection of the tool bar and legs is adequate. A helical tension spring 22 is connected between diametrically opposite corners of the parallelogram frame just described so as resiliently to skew the parallelogram member to the right as viewed in Fig. 1. Obviously connection of the spring to the other corners preconditions the frame for left hand operation.

A tool post 23 is rigidly mounted on an end of a tool bar 20 as by a clamp 24 of any suitable form and downwardly extended therefrom. A weed cutting blade 25 is bolted or otherwise secured to the lower end of the tool post in a substantially horizontal position, as shown in Fig. 2. The blade preferably is of V shape having its apex connected to the post and providing legs rearwardly and divergently extended. The cultivator of the present invention may embody a weed cutting blade having a single leg rearwardly and laterally outwardly extended for earth engagement between vines and the like arranged in a row but it has been discovered that a single blade in earth engagement has a tendency to drift laterally and thus is somewhat more difficult to control. The employment of a blade having divergent rearwardly extended legs provides a balanced operation and the blade is easily reciprocated for adjustment purposes transversely of the line of draft while in earth engagement. The leg which is rearwardly and laterally outwardly extended is, for descriptive convenience, designated at 26 and provides a mold board 27 adapted slightly to elevate and to roll inwardly earth and debris encountered by the leg 26 of the blade.

A bracket member 28 is rigidly mounted on the tool bar 20 in adjustably spaced relation to the tool post 23 and weed cutting blade 24 by a clamp. A journal 30 is upwardly extended from the rearward end portion of the bracket member 28 and an annular stop collar 31 mounted in circumscribing relation on the journal adjacent to the bracket member.

A rotary guard 33 is rotatably mounted in a substantially horizontal attitude on the bracket member 28 above the weed cutting blade 24. The guard provides a hub 34 rotatably mounted on the journal for floating movement axially thereof. A plurality of spokes 35 are radially extended from the hub and mount a rim 36 concentrically of the hub. The rim may be provided with a resilient tire, not shown, if desired, but it has been discovered that for the usual type of crops in which the cultivator is employed, no such tire is necessary inasmuch as continued rotation of the guard during operation minimizes damages to vines by engagement with the guard. The guard 33 is preferably of light weight construction but preferably employs a greater number of spokes than would be necessary merely to support the rim 36 for contact by earth and debris rolled inwardly by the mold board 26.

A tilting lever 37 is rigidly mounted on the tool bar 20 and upwardly extended therefrom. A telescopic link 38 is connected to the draft bar 11 by a universal joint 39 and to the upwardly extended end of the lever 37 by a similar universal joint 40. The link 38 conveniently takes the form of aligned portions 41 and 42 interconnected in end to end relation by a screw-threaded coupling 43. The adjacent ends of the portions 41 and 42 of the link are provided with left and right hand threads so that rotation of the coupling serves to draw the adjacent ends together or to thrust the ends away from each other depending upon the direction of rotation. Jam nuts 44 are screw-threadably mounted on the portions 41 and 42 engageable with opposite ends of the coupling 43 to lock the same in adjusted position against rotation. The link 38 is provided in a vertical plane substantially parallel to the legs 18, as shown in Fig. 1, so that the parallelogram frame is free to skew for lateral movement of the tool bar 20 independent of the telescopic adjustment of the link.

Operation

The operation of the vineyard cultivator, above described, is believed to be apparent and is briefly summarized at this point. The draft appliance 10 is driven in parallel relation and adjacent to a row of spaced obstructions such as grapevines, the trunks of which are represented at 46. The control cranks 16 are manipulated in the well known manner to lower the draft bar 11 and thus the tool bar 20 to bring the weed cutting blade 25 into earth engagement. The telescopic link 38 is adjusted to achieve the desired cutting angle for the blade 25 in relation to the type of soil to be cultivated and its condition.

The spring 22 urges the parallelogram frame into the position shown in full line in Fig. 1 with the tool bar 20 resiliently held in a position closely adjacent to the grapevines as the draft appliance draws the cultivator therealong.

The clamp member 29 is positioned on the tool bar 20 so that the rotary guard 33 extends across the leg 26 and provides a quadrant forwardly and laterally extended from the blade. So positioned, the bracket member 28, and thus the rotary guard 33 is clamped on the tool bar for horizontal unitary movement with said bar and the weed cutting blade.

As the blade 25 is drawn through the earth, weeds are severed below the surface traversed and the weeds, debris, earth, and the like rolled inwardly by the mold board 27. The rotary guard 33 is positioned so that spokes 35 thereof extend into the path of discharge of the mold board 27. The weeds, debris, earth and the like rolled inwardly by the mold board strike the spokes 35 eccentrically of the guard 33 and impart rotary motion to the guard with the rim thereof extended across the blade 24 rotated rearwardly, clockwise in the form shown in Fig. 1, by such contact. The guard is free to float on the journal 30 and when clumps of weeds, collections of debris, large clods and the like are turned by the mold board 27, the guard 33 floats upwardly and permits the passage of such enlarged masses freely between the blade and guard.

As a vine 46 is approached by the cultivator, the rim 36 encounters the trunk thereof, as shown in Fig. 1. The initial rotation of the guard 33 imparted thereto by discharge of material from the mold board eccentrically against the guard, causes the guard to roll around the trunk with a minimum of abrasion, skinning, and force applied thereagainst. The engagement of the rotating guard with the vine overcomes the resilient effect of the spring 22 forcing the guard 33, blade 25, and parallelogram frame into the position shown in dashed line in Fig. 1. Proper positioning of the guard relative to the blade assures thorough removal of weeds, debris, and dirt closely adjacent to the vine.

As the vine is passed by the guard 33, the spring 22 maintains the guard in vine engagement. As soon as the guard is disengaged from the vine the spring returns the parallelogram frame, guard and blade into the position indicated in full line in Fig. 1 for effective cultivation between the vines.

The structure of the present invention is fully effective in its operation, achieving a removal of weeds, debris, and earth from between the vines of the row more completely than conventional automatic vineyard cultivators and without the damage to the vines conventionally expected from such automatic devices. Further, the cultivator of the present invention is produced at a total cost only a fraction of the cost of production of conventional automatic vineyard cultivators, at a cost approximating that of conventional French plows exemplified by the Garric patent to which reference has been made. The overall height of the structure is such that it makes possible cultivation between the vines throughout the growing season. With the devices for the purpose heretofore known in viticulture, such cultivation is precluded by the seasonal growth.

The essence of the invention is believed to reside in the combination of a frame, an earth working tool mounted on the frame for lateral movement relative to a line of draft, said earth working tool being adapted to roll and/or elevate encountered material, and a rotary guard mounted for horizontal unitary movement with the earth working tool arranged eccentrically to receive material discharged by the earth working tool for rotation of the guard.

Although I have herein shown and described my invention in what I have conceived to be the most practical and preferred embodiment, it is recognized that departures may be made therefrom within the scope of the invention, which is not to be limited to the details disclosed herein, but is to be accorded the full scope of the claims so as to embrace any and all equivalent devices and structures.

Having described my invention what I claim as new and desire to secure by Letters Patent is:

1. In an earth traversing vineyard cultivator the combination of an earth working tool adapted appreciably to elevate earth encountered during earth traversing movement, and a circular guard mounted for horizontal rotational movement above the earth working tool having a peripheral portion located in advance of said tool, the guard being positioned relative to the tool for eccentric contact thereof by earth elevated by the tool.

2. A vineyard cultivator comprising an earth working tool having a predetermined path of discharge for earth encountered during earth traversing movement, means mounting the tool for earth traversing movement along a controlled line of draft, a substantially erect journal positioned rearwardly and laterally offset from the tool relative to the line of draft, and a circular guard rotatably mounted on the journal for axial floating movement having a peripheral portion extended across the earth working tool and appreciably forwardly thereof, said guard having an eccentric portion located in the path of discharge of the earth working tool.

3. A vineyard cultivator comprising a weed cutter having a mold board adapted during earth traversing movement to lift and turn encountered weeds and earth in a predetermined path of discharge therefor, means mounting the cutter for earth traversing movement along a controlled line of draft and adjustable reciprocable movement transversely of the line of draft, resilient means connected to the mounting means urging the cutter into a predetermined position relative to the mounting means, a substantially erect journal mounted rearwardly and laterally of the cutter, and a circular guard rotatably mounted on the journal for axial floating movement thereon and having a peripheral portion extended laterally across the cutter and forwardly thereof, said cutter having a portion eccentric thereof located in the path of discharge of the cutter.

4. A vineyard cultivator comprising a substantially horizontal skewable parallelogram frame having forward and rearward end portions, said frame including a draft bar transversely of the frame in the forward end portion thereof, a pair of transversely spaced legs pivotally connected to the draft bar and rearwardly extended therefrom, a tool bar substantially parallel to the draft bar in the rearward end portion of the frame, universal joints mounting the tool bar in a substantially horizontal position on the rearwardly extended end portions of the legs; a resilient tension member connected between diagonal corners of the frame; an arm fixedly mounted on the tool bar and upwardly extended therefrom; an adjustable link connected to the draft bar and to the upwardly extended end portion of the arm; a weed cutting blade mounted on the tool bar in a substantially horizontal position below an end portion thereof and extended laterally and rearwardly therefrom; a bracket member rearwardly extended from the tool bar adjacent to the weed cutting blade; a journal member upwardly extended from the rearward end portion of the bracket member laterally of the weed cutting blade; a circular guard having a hub rotatably mounted on the journal for floating movement thereon, spokes radially extended from the hub, and a circular rim having a forward and laterally disposed quadrant portion located forwardly and above the weed cutting blade; and a mold board integral with the weed cutting blade located below the circular guard in adjacent relation to the spokes thereof adapted to direct material engaged upon earth traversing movement against the spokes and by such engagement to impart rotary motion to the guard.

ROY W. SMEDS.

REFERENCES CITED

The following references are of record in the file of this patent:

UNITED STATES PATENTS

| Number | Name | Date |
|---|---|---|
| 243,090 | Unthank | June 21, 1881 |
| 1,048,340 | Peterson | Dec. 24, 1912 |
| 1,620,085 | Driscoll | Mar. 8, 1927 |
| 2,024,786 | Travers | Dec. 17, 1935 |
| 2,452,212 | Shimmon | Oct. 26, 1948 |

FOREIGN PATENTS

| Number | Country | Date |
|---|---|---|
| 105,053 | Australia | Sept. 2, 1938 |